(12) United States Patent
Jeon et al.

(10) Patent No.: US 11,166,193 B2
(45) Date of Patent: Nov. 2, 2021

(54) TERMINAL AND BASE STATION IN WIRELESS COMMUNICATION SYSTEM, AND COMMUNICATION METHOD THEREOF

(71) Applicant: SAMSUNG ELECTRONICS CO., LTD., Suwon-si (KR)

(72) Inventors: Jaehwan Jeon, Seoul (KR); Sejin Park, Suwon-si (KR); Wonil Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/632,052

(22) PCT Filed: Jul. 13, 2018

(86) PCT No.: PCT/KR2018/007977
§ 371 (c)(1),
(2) Date: Jan. 17, 2020

(87) PCT Pub. No.: WO2019/022418
PCT Pub. Date: Jan. 31, 2019

(65) Prior Publication Data
US 2020/0154306 A1  May 14, 2020

(30) Foreign Application Priority Data
Jul. 26, 2017 (KR) .................. 10-2017-0094517

(51) Int. Cl.
*H04W 28/04* (2009.01)
*H04L 1/16* (2006.01)
*H04W 56/00* (2009.01)

(52) U.S. Cl.
CPC ........... *H04W 28/04* (2013.01); *H04L 1/1685* (2013.01); *H04W 56/009* (2013.01)

(58) Field of Classification Search
CPC ... H04W 28/04; H04W 56/009; H04W 28/02; H04W 28/06; H04L 1/1685; H04L 1/188
See application file for complete search history.

(56) References Cited

U.S. PATENT DOCUMENTS

2003/0202501 A1* 10/2003 Jang ................. H04L 1/1685
370/346
2008/0279171 A1 11/2008 Kim et al.
(Continued)

FOREIGN PATENT DOCUMENTS

| CN | 101542955 | 6/2016 |
| EP | 2 234 310 | 9/2010 |

(Continued)

OTHER PUBLICATIONS

Extended Search Report dated Jun. 5, 2020 in counterpart European Patent Application No. 18837943.2.
(Continued)

Primary Examiner — Thai Nguyen
(74) Attorney, Agent, or Firm — Nixon & Vanderhye, P.O.

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The communication method of a base station in a wireless communication system, according to one embodiment of the disclosure, can comprise the steps of: setting a transmission period of a poll bit for indicating the transmission of information on whether a packet has been successfully received; generating a packet including the poll bit set on the basis of the transmission period; and transmitting the generated packet to a terminal.

15 Claims, 12 Drawing Sheets

(56) References Cited

U.S. PATENT DOCUMENTS

| | | | |
|---|---|---|---|
| 2008/0279211 | A1 | 11/2008 | Chitrapu et al. |
| 2010/0118857 | A1 | 5/2010 | Chun et al. |
| 2010/0238910 | A1 | 9/2010 | Conway et al. |
| 2011/0019756 | A1 | 1/2011 | Chun et al. |
| 2015/0237653 | A1 | 8/2015 | Chun et al. |
| 2015/0319635 | A1* | 11/2015 | Bergquist .............. H04L 1/1887 370/241.1 |

FOREIGN PATENT DOCUMENTS

| | | |
|---|---|---|
| KR | 10-0434054 | 6/2004 |
| KR | 10-2008-0099779 | 11/2008 |
| KR | 10-2010-0018085 | 2/2010 |
| KR | 10-1461970 | 11/2014 |
| WO | 2009/116788 | 9/2009 |

OTHER PUBLICATIONS

Zte et al: "Discussion on fast centralized retransmission of lost RLC PDUs during inter-DU handover", 3GPP Draft; R3-171022, 3GPP TSG RAN WG3 Meeting #95, Mar. 25, 2017 (7 pages).
International Search Report for PCT/KR2018/007977 dated Oct. 16, 2018, 17 pages.
Written Opinion of the ISA for PCT/KR2018/007977 dated Oct. 16, 2018, 6 pages.
Office Action dated Feb. 19, 2021 in counterpart Korean Patent Application No. 10-2017-0094517 and English-language translation.

\* cited by examiner

TERMINAL AND BASE STATION IN WIRELESS COMMUNICATION SYSTEM, AND COMMUNICATION METHOD THEREOF

This application is the U.S. national phase of International Application No. PCT/KR2018/007977 filed Jul. 13, 2018 which designated the U.S. and claims priority to KR Application No. 10-2017-0094517 filed Jul. 26, 2017, the entire contents of each of which are hereby incorporated by reference.

TECHNICAL FIELD

The disclosure relates to a wireless communication system and, more particularly, to a terminal and base station performing a non-time critical operation and a communication method thereof.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a 5G communication system, there is a need to solve a problem which may occur in a non-time critical processing structure.

SUMMARY

Due to such a need, the disclosure proposes a method of solving a problem which may occur in a non-time critical processing structure in a 5G communication system.

According to the disclosure, a communication method of a base station in a wireless communication system may include setting a transmission period of a poll bit indicative of the transmission of information for whether the reception of a packet is successful, generating a packet including the poll bit set based on the transmission period, and transmitting the generated packet to a terminal.

Furthermore, according to an embodiment of the disclosure, a base station in a wireless communication system may include a communication circuitry configured to transmit and receive signals and a controller configured to set a transmission period of a poll bit indicative of the transmission of information for whether the reception of a packet is successful, generate a packet including the poll bit set based on the transmission period, and control the communication circuitry to transmit the generated packet to a terminal.

According to an embodiment of the disclosure, a communication method of a terminal in a wireless communication system may include receiving, from a base station, a packet in which a poll bit indicative of the transmission of information for whether the reception of a packet is successful has been set, generating a status report message indicating whether the reception of at least one packet received from the base station is successful in case that the packet in which the poll bit has been set is received, and transmitting the generated status report message to the base station.

Furthermore, according to an embodiment of the disclosure, a terminal in a wireless communication system may include a communication circuitry configured to transmit and receive signals and a controller configured to control the communication circuitry to receive, from a base station, a packet in which a poll bit indicative of the transmission of information for whether the reception of a packet is successful has been set, to generate a status report message indicating whether the reception of at least one packet received from the base station is successful in case that the packet in which the poll bit has been set is received, and to control the communication circuitry to transmit the generated status report message to the base station.

According to an embodiment of the disclosure, efficiency of an air resource use can be improved because a base station in a 5G communication system does not perform unnecessary retransmission.

DETAILED DESCRIPTION OF EXAMPLE EMBODIMENTS

Figure 1:
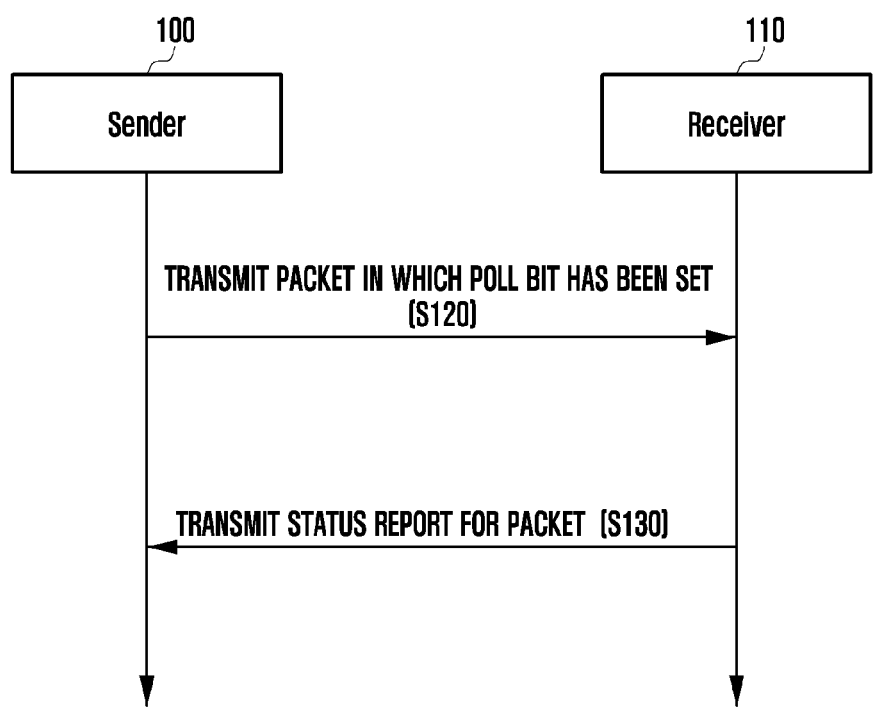
FIG. 1 is a diagram illustrating an embodiment in which in a common communication system, packets are transmitted between a sender and a receiver and status reports for packets are received between them.

Hereinafter, embodiments of the disclosure are described in detail with reference to the accompanying drawings.

In this specification, in describing the embodiments, a description of contents that are well known in the art to which the disclosure pertains and not directly related to the disclosure is omitted in order to make the gist of the disclosure clearer.

For the same reason, in the accompanying drawings, some elements are enlarged, omitted or depicted schematically. Furthermore, the size of each element does not accurately reflect its real size. In the drawings, the same or similar elements are assigned the same reference numerals.

The merits and characteristics of the disclosure and a method for achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure of the disclosure and to allow those skilled in the art to understand the category of the disclosure. The disclosure is defined by the category of the claims. The same reference numerals will be used to refer to the same or similar elements throughout the drawings.

In this case, it will be understood that each of the blocks of the flowchart drawings and combinations of the blocks in the flowchart drawings can be executed by computer program instructions. These computer program instructions may be mounted on the processor of a general purpose computer, a special purpose computer or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operational steps to be performed on the computer or other programmable apparatus to produce a computer-executed process, so that the instructions performing the computer or other programmable apparatus may provide steps for executing the functions described in the flowchart block(s).

Furthermore, each block of the flowchart drawings may represent a portion of a module, a segment or code, which includes one or more executable instructions for implementing a specified logical function(s). It should also be noted that in some alternative implementations, the functions noted in the blocks may be performed out of order. For example, two blocks shown in succession may in fact be executed substantially concurrently or the blocks may sometimes be executed in the reverse order, depending upon the functionality involved.

In this case, the term "unit", as used in the present embodiment means software or a hardware component, such as a field programmable gate array (FPGA) or an application-specific integrated circuit (ASIC), and the "unit" performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more CPUs within a device or a security multimedia card.

In general, a terminal in the disclosure may include a mobile terminal, and may indicate a device that has subscribed to a mobile communication system and that is provided with services from the mobile communication system. The mobile terminal may include a smart device, such as a smartphone or a tablet PC. This corresponds to an example, and the disclosure is not limited thereto.

FIG. 1 is a diagram illustrating an embodiment in which in a common communication system, packets are transmitted between a sender 100 and a receiver 110 and status reports for packets are received between them.

Specifically, in a common communication system such as a long term evolution (LTE) communication system, a radio link control (RLC) layer may reconfigure a packet data convergence protocol packet data unit (PDCP PDU) in a proper size and perform an automatic repeat request (ARQ) operation, etc.

Major functions of the RLC layer may be summarized as follows.
Data transfer function (Transfer of upper layer PDUs)
ARQ function (Error Correction through ARQ (only for AM data transfer))
Concatenation, segmentation and reassembly (Concatenation, segmentation and reassembly of RLC SDUs (only for UM and AM data transfer))
Re-segmentation function (Re-segmentation of RLC data PDUs (only for AM data transfer))
Reordering function (Reordering of RLC data PDUs (only for UM and AM data transfer)
Duplicate detection function (Duplicate detection (only for UM and AM data transfer))
Error detection function (Protocol error detection (only for AM data transfer))
RLC SDU discard function (RLC SDU discard (only for UM and AM data transfer))
RLC re-establishment function (RLC re-establishment)

The RLC layer may operate by transmission time interval (TTI) based scheduling. In this case, the TTI may be 1 ms. The RLC layer may calculate a buffer occupancy (BO) every TTI, may receive scheduling information from a lower layer, and may generate an RLC PDU.

When the RLC PDU is transmitted, the RLC layer may receive a status report from a receiver using a poll bit within an RLC header. The poll bit is for indicating the transmission of information for whether the reception of a packet is successful. Accordingly, the receiver may transmit the status report, including acknowledgement (ACK) and negative acknowledgement (NACK) information for the RLC PDU transmitted by the RLC layer, based on the poll bit. In this case, the RLC layer may guarantee transmission in an RLC interval by performing retransmission on the RLC PDU indicated as NACK in the received status report.

In this case, examples of a condition in which the RLC layer includes the poll bit in the RLC header are as follows.
  if RLC PDUs corresponding to a set number of poll PDUs have been transmitted
  if RLC PDUs corresponding to a set size of poll bytes have been transmitted if there is no RLC PDU transmitted if a status report for an RLC PDU including a poll bit has not been received Accordingly, as illustrated in FIG. 1, when the sender 100 transmits, to the receiver 110, a packet in which a poll bit has been set (step S120), the receiver 110 may transmit a status report for the packet (step S130). The sender 100 may be a base station, and the receiver 110 may be a terminal. Furthermore, the packet in which the poll bit has been set may be an RLC PDU. The RLC PDU may be generated in the RLC layer of the base station or may be generated in the RLC layer of a CU included in the base station.

The poll bit is for indicating the transmission of information indicating whether the reception of the packet received from the receiver 110 is successful. Accordingly, when the packet in which the poll bit has been set is received, the receiver 110 may generate a status report indicating whether the reception of at least one packet transmitted by the sender 100 is successful, and may transmit the status report to the sender 100.

In a 5G communication system, high throughput processing is essential because mobile data traffic is significantly increased. The 5G communication system may operate in a shorter TTI than LTE.

Accordingly, if a 4G RLC structure is assumed, a processing time and development cost may be increased because more RLC PDUs need to be generated within a scheduling time shorter than that of the existing structure. In this case, if a part capable of being performed in advance is included in the RLC function, a processing load within a scheduling time may be reduced.

Accordingly, in a 5G communication system, a method of dividing the RLC function of a common communication system into a non-time critical part capable of being pre-processed and a part operating by scheduling and processing the parts may be proposed. In this case, a part that belongs to the RLC function and that is non-time critical may operate in a central unit (CU) having high processing power and capable of resource efficiency through virtualization. An ARQ function may be basically performed in the part.

Figure 2:
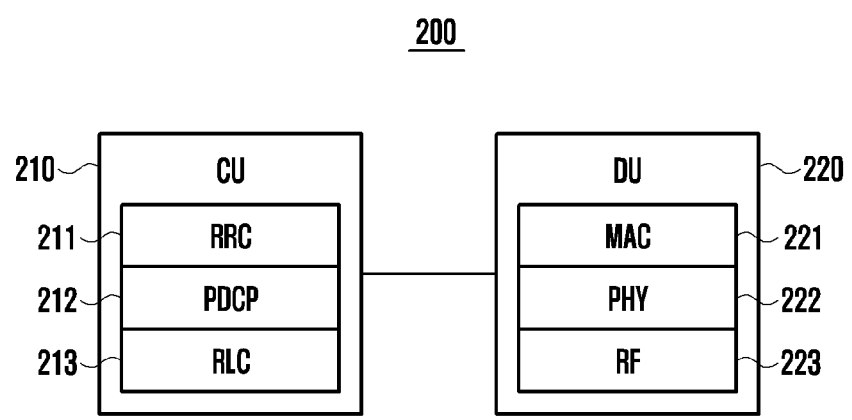
FIG. 2 is a diagram illustrating the structure of a first base station and a second base station included in a base station.

Specifically, as illustrated in FIG. 2, in a 5G communication system, a base station 200 may include a CU 210 and a distributed unit (DU) 220. Each of the units (CU and DU) may perform an operation of the base station. Furthermore, in the following embodiments, each of the units may be mentioned as an independent base station. For example, the CU 210 may be denoted as a first base station, and the DU 220 may be denoted as a second base station.

However, in one embodiment, the constructions of the CU 210 and the DU 220 may be differently configured. More specifically, the radio-related layer of the DU may be separated and configured as another node. Furthermore, the characteristic of the disclosure may be applied to another modified configuration.

Furthermore, the CU may also include another layer, and some layers may be omitted from the CU. As illustrated in FIG. 2, the CU includes a radio resource control (RRC) layer 211, a PDCP layer 212 and an RLC layer 213. If a CU transmits and receives signals to and from a node that performs operations related to a PDCP layer and an RLC layer and performs an operation of a MAC layer, an embodiment related to the CU 210 of the disclosure may be applied to the CU.

Furthermore, the DU 220 may also include another layer, and some layers may be omitted from the DU. As illustrated in FIG. 2, if a DU transmits and receives signals to and from a node that performs operations related to the functions of a medium access control (MAC) layer 221, a physical (PHY) layer 222 and a radio frequency (RF) 223 and performs an operation of an RLC layer, an embodiment related to the DU 220 of the disclosure may be applied to the DU.

According to the base station 200 of FIG. 2, the CU 210 of the disclosure may transmit, to the DU 220, a processed RLC PDU via the PDCP layer and the RLC layer. Furthermore, the DU 220 may perform the functions of the MAC and PHY layers and an RF function on the RLC PDU received from the CU 210. The DU 220 may transmit the RLC PDU received from the CU 210 to a terminal.

Furthermore, in a device aspect, nodes to which the embodiment may be applied may be called a CU or a DU.

An interface between the CU 210 and the DU 220 may be referred to as a fronthaul so that it can be compared to the backhaul concept of a core network (CN). The fronthaul may be a non-ideal network, such as an Internet protocol network. In this case, an RLC operation for an ARQ is inevitably influenced by the fronthaul, that is, an interface between the CU and the DU.

For example, if congestion occurs between the CU and the DU, an ARQ operation is slowly performed because latency for RLC PDU transmission and status report reception is increased.

Accordingly, the disclosure proposes a method of solving a problem which may occur in the non-time critical RLC processing structure of a 5G communication system having a structure different from that of a common communication system, such as LTE.

As described above, when an ARQ for a downlink packet is driven, the RLC layer of a common communication system may retransmit the packet based on a set number of poll PDUs and a set size of poll bytes.

Figure 3:
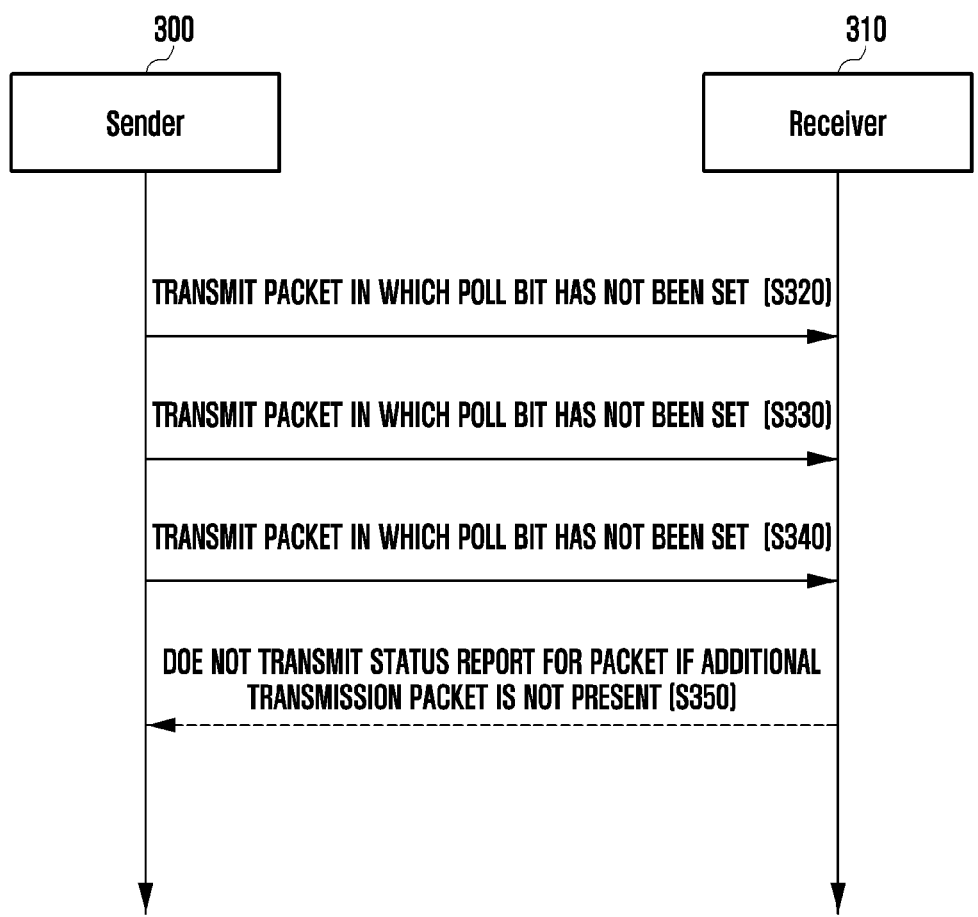
FIG. 3 is a flowchart illustrating a problem which may occur if a poll bit has been set.

According to the contents, FIG. 3 is a flowchart illustrating a problem which may occur if a poll bit has been set. According to one embodiment, FIG. 3 illustrates a case where the number of poll PDUs has been set to 4.

First, at step S320, a sender 300, such as a base station, may transmit, to a receiver 310, such as a terminal, a packet in which a poll bit has not been set. The poll bit may be set in the header of RLC. For example, if the packet is a packet to request a status report from the terminal, the sender 300 may set the poll bit in the RLC header and transmit the packet. If the sender does not request a status report from the terminal, it may not set a poll bit in the RLC header and transmit the packet. Alternatively, in the RLC header, the poll bit may set to "0" or "1." Accordingly, if the packet is a packet to request a status report from the terminal, the sender 300 may set the poll bit to "0" or "1" in the RLC header. If the sender does not request a status report from the terminal, it may set the poll bit to "1" or "0" (opposite to the case where the status report is requested) in the RLC header. However, this is merely an embodiment, and the poll bit may be set in various ways so that the terminal can identify whether a corresponding packet is a packet in which a status report will be transmitted.

FIG. 3 illustrates an embodiment in which the number of poll PDUs has been set to 4. Accordingly, if the sender 300 no longer transmits a packet after transmitting, to the receiver 310, three packets in which a poll bit has not been set or which include a poll bit configured so that a status report is not reported through step S320 to step S340, this corresponds to a case where an additional packet is not present. Accordingly, at step S350, the receiver 310 does not transmit a status report for a packet.

The case where the sender 300 no longer transmits a packet after transmitting the three packets may be a case where an IP packet is no longer received from a core network. For example, when an IP packet is received from a core network, the sender 300 may generate a packet based on the received IP packet and transmit the generated packet to the receiver 310.

Accordingly, in a non-time critical structure, if the continuous reception of a downlink IP packet from a core network is not present, a problem with a retransmission operation may occur. In the embodiment of FIG. 3, the sender 300 cannot receive feedback information for the packets transmitted at step S320 to S340, for example, ACK/NACK information.

In order to overcome a problem which may occur in an embodiment such as FIG. 3, the disclosure proposes a periodic timer based polling function.

Figure 4:
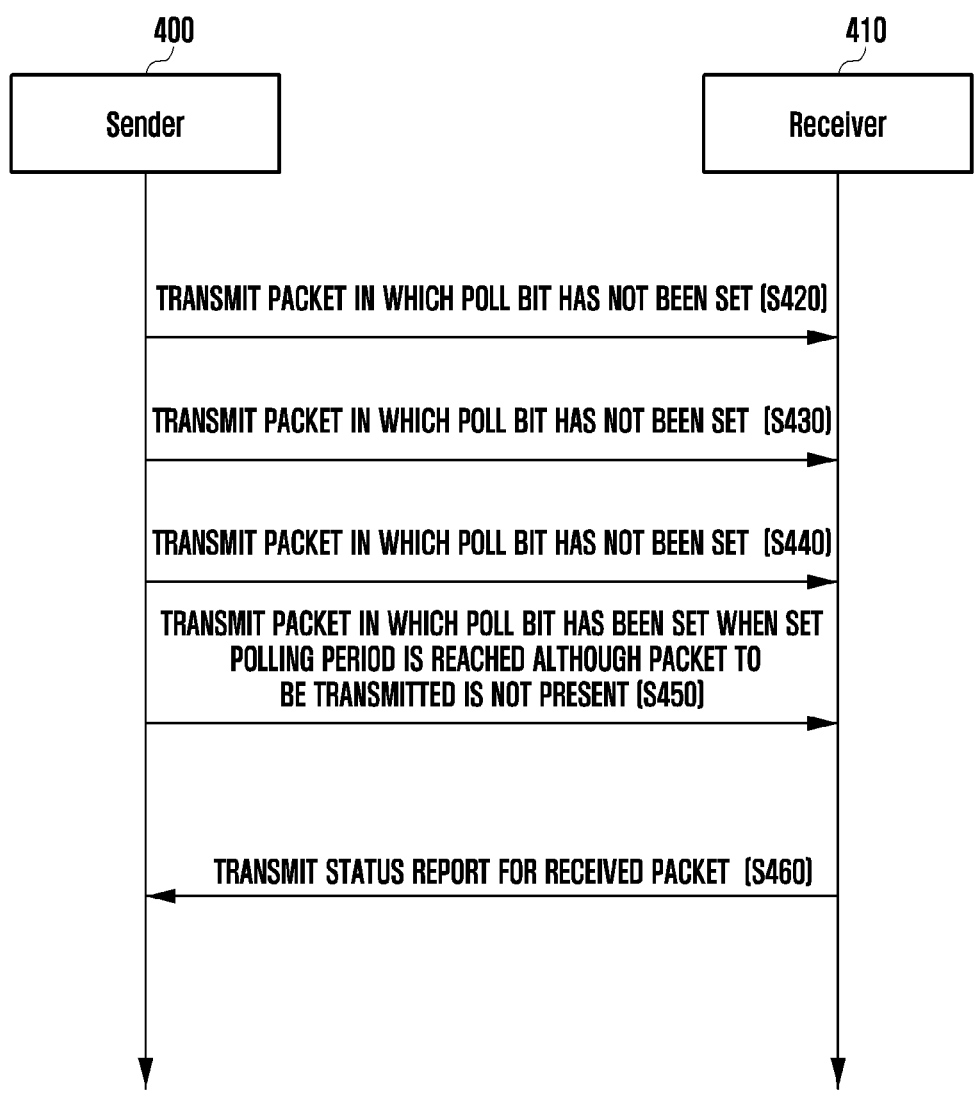
FIG. 4 is a sequence diagram illustrating a communication method of a base station and a terminal if a polling period, that is, the transmission period of a poll bit, has been configured according to an embodiment of the disclosure.

Specifically, FIG. 4 is a sequence diagram illustrating a communication method of a base station and a terminal if a polling period, that is, the transmission period of a poll bit, has been configured according to an embodiment of the disclosure. The poll bit is for indicating the transmission of information for whether the reception of a packet is successful, and may be included in the header of the packet. For example, the poll bit may be set in the header as a size of 1 bit.

FIG. 4 illustrates a case where a polling period, that is, the transmission period of a poll bit indicating whether to retransmit a packet, has been set to 4 according to an embodiment of the disclosure. The polling period may be a unit of tens or hundreds depending on an RTT situation of a CU or a DU.

At step S420, a sender 400, such as a base station, may transmit a packet in which a poll bit has not been set. If a set polling period is not reached even at step S430 and step S440, the sender 400 may transmit a packet in which a poll bit has not been set.

At step S450, although a packet to be transmitted is not present, when a set polling period is reached, the sender 400 may transmit a packet in which a poll bit has been set. For example, when a set polling period is reached, the sender 400 may generate a packet in which a poll bit has been set regardless of the number of transmitted packets, and may transmit the packet to a receiver 410. The sender 400 may transmit, to the receiver 410, a packet including a poll bit every set polling period regardless of the size (bytes) of transmitted packet in addition to the number of transmitted packets. In this case, the packet may be an RLC PDU generated in the RLC layer of the sender 400.

The packet in which the poll bit has been set may be a packet generated to include a header in which the poll bit has been set using a packet finally transmitted before the set polling period is reached. Specifically, the packet may be a packet in which the poll bit has been set in the header of the packet using the payload of a finally transmitted packet. Alternatively, the packet may be a dummy packet. This is merely an embodiment, and the packet has only to include a header in which a poll bit has been set regardless of the contents of a payload.

At step S460, the receiver 410 may transmit a status report for the received packet. Specifically, the receiver 410 may transmit a status report message indicating whether the reception of at least one packet transmitted by the sender 400 is successful. For example, the receiver 410 may transmit, to the sender 400, a status PDU including a status report.

In the embodiment illustrated in FIG. 4, the receiver 410 may generate a status report message indicating whether the reception of the transmitted packets is successful through step S420 to step S450, and may transmit the message to the sender 400.

Although not illustrated in FIG. 4, the sender 400 that has received the status report may perform retransmission on a packet indicated as NACK by the receiver 410.

According to an embodiment, such as that described above, when a service provider or an operator continuously attempts to provide service that does not generate traffic, it can guarantee the transmission and reception of packets in an RAN interval using periodic polling.

Figure 5A:
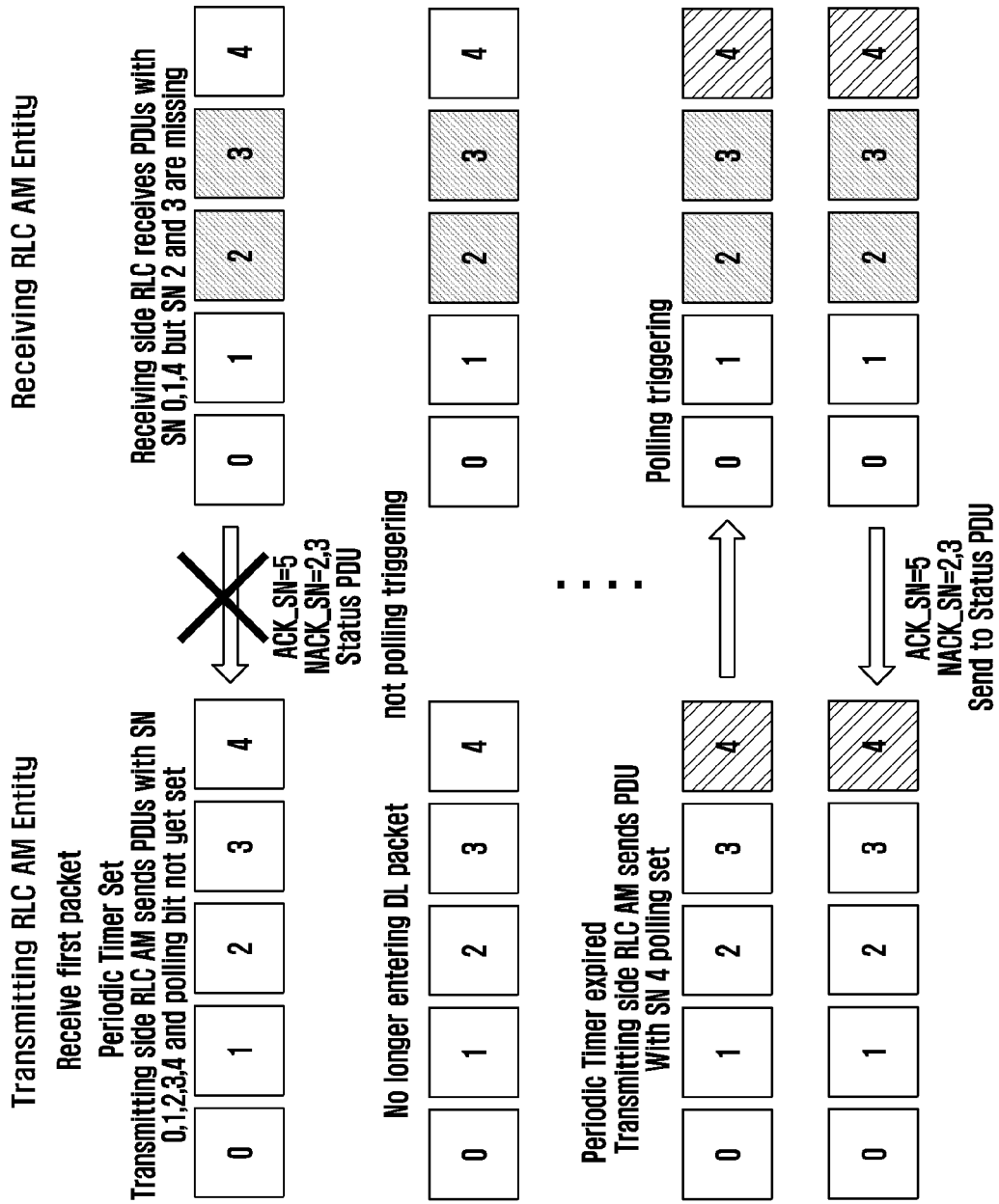
FIGS. 5A and 5B are diagrams illustrating a method of transmitting an RLC PDU including a poll bit in a set polling period.
Figure 5B:
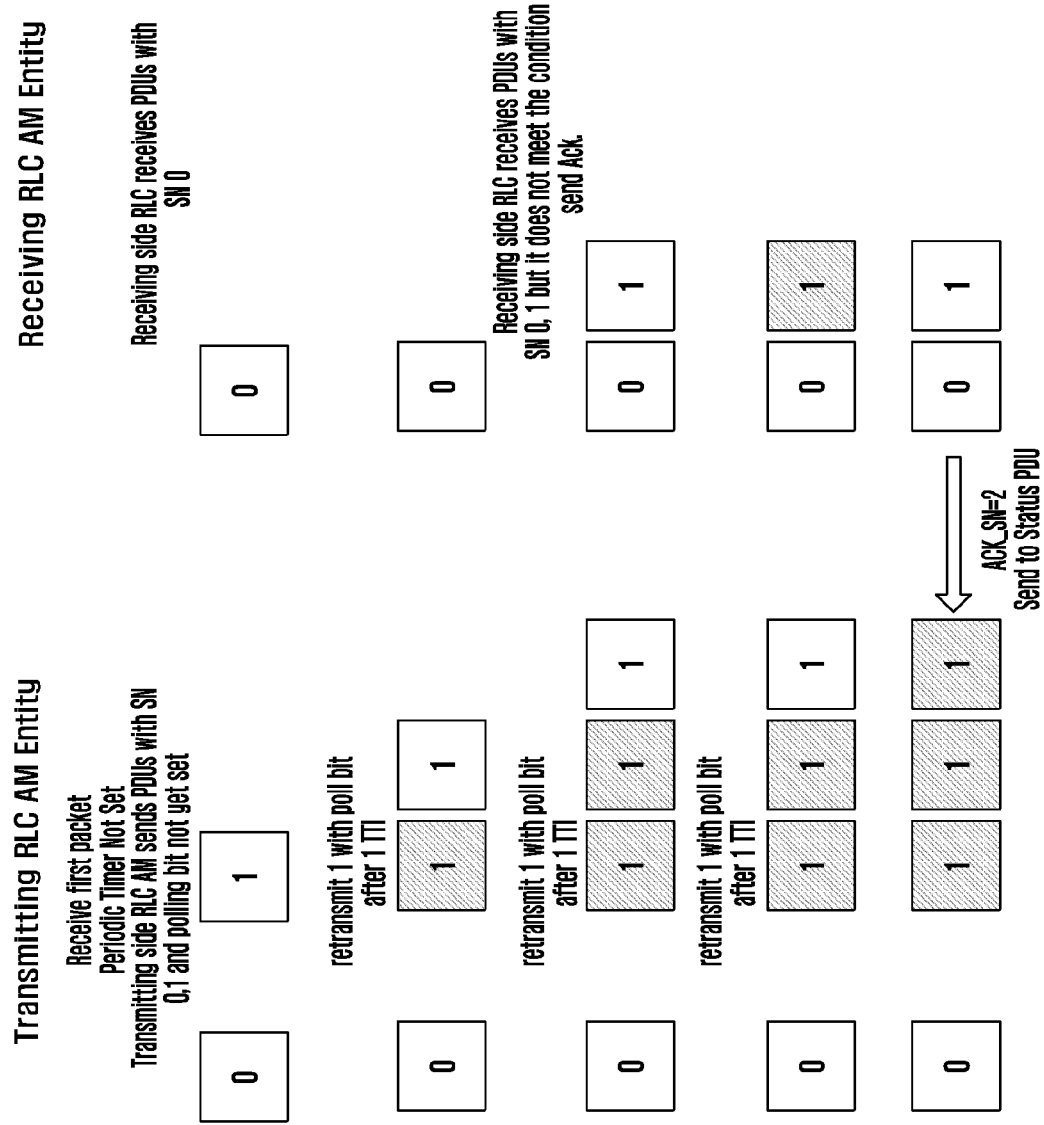

A method of transmitting an RLC PDU including a poll bit based on a polling period set by an operator is described specifically with reference to FIG. 5A.

Specifically, a sender may be configured with the number or size of pollings and a polling period, that is, the transmission conditions of a poll bit indicating whether to retransmit a packet. For example, the sender may be configured with the polling conditions by an operator.

If a polling condition does not comply with the configured polling conditions, the RLC layer of a sender may generate an RLC PDU in which a poll bit has not been set by processing an IP packet received from a core network. For example, the poll bit may be included in an RLC header included in the RLC PDU. In this case, the RLC layer may empty an RLC header part indicative of a poll bit indicating whether to perform retransmission or may indicate the poll bit in an RLC header part using a given bit, such as "0" indicating that retransmission is not requested.

As illustrated in FIG. 5A, although the reception of packets having sequence numbers (SNs) of 2 and 3 is omitted, the RLC layer of a sender cannot receive a status report, including ACK or NACK information, from a terminal because the polling conditions are not satisfied.

In contrast, the RLC layer of the sender processes an IP packet received from a core network and transmits an RLC PDU from SNs 0 to 4. When a set polling period is received, the RLC layer may generate and retransmit the RLC PDU of the SN 4 in which a poll bit has been set regardless of the number of transmitted packets or the size of the transmitted packet.

For example, the RLC layer of a sender may set a poll bit to 0 in the header of the RLC PDU of each of SNs 0 to 3. Furthermore, the RLC layer may set a poll bit to 1 in the header of the RLC PDU of an SN 4.

The RLC layer of a receiver that has received the RLC PDU of the SN 4 in which the poll bit has been set to 1 may generate a status report including ACK/NACK information for the RLC PDUs of the SNs 0 to 4. Furthermore, the RLC layer of the receiver may transmit the status report to the sender.

If the RLC PDU of the SN 3 has been generated and the polling period has been reached, but an IP packet received from a core network is not present, the RLC layer may generate a dummy PDU. For example, a poll bit has been set to 1 in the header of the RLC PDU of an SN 4, but a payload may be generated as a dummy payload.

Alternatively, the RLC layer may generate the RLC PDU of an SN 4 in which a poll bit has been set using the RLC PDU of the SN 3. For example, a poll bit may be set to 1 in the header of the RLC PDU of an SN 4, and the payload of the RLC PDU of the SN 3 may be used as a payload.

According to another embodiment of the disclosure, RLC may be present in a DU not a CU. Conditions on which RLC sets a polling bit may include a "case where an RLC PDU to be transmitted is not present." In a 5G communication system, a TTI is reduced to ¼ or ⅕ compared to the existing LTE system, and thus a case where throughput is low may comply with the conditions. In this case, an RLC sender adds a polling bit to an RLC PDU for which ACK has not been received and performs retransmission. The retransmission may excessively consume air resources because it is an unnecessary operation. Accordingly, an operator may adjust retransmission timing based on a network situation by applying a polling period proposed in the disclosure. RLC may not perform retransmission before the polling period is reached.

If a base station includes a first base station and a second base station as described above, there is a need for a method by which the first base station and the second base station are not influenced by a non-ideal fronthaul therebetween. Hereinafter, the first base station is referred to as a CU, and the second base station is referred to as a DU.

In a common communication system, an RLC parameter has been calculated based on an HARQ RTT between a base station (DU) and a terminal. The DU of the common communication system may include RLC and MAC. However, according to an embodiment of the disclosure, if an ARQ is performed in the CU, not an HARQ RTT, but transmission delay between the CU and DU may influence RLC Parameter setting.

Figure 6:
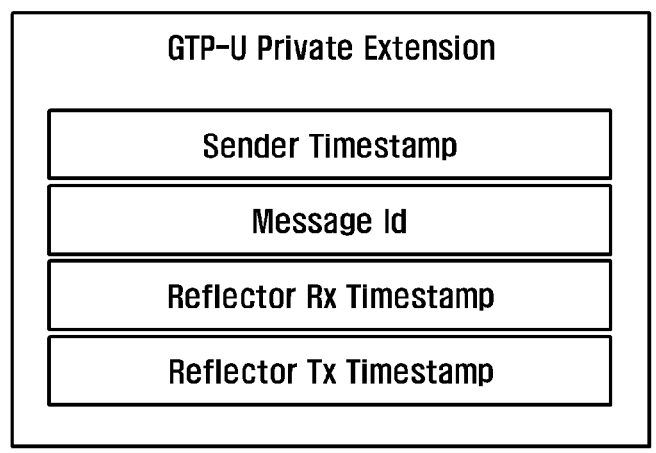
FIG. 6 is a diagram describing a GTP-U private extension.

Accordingly, the disclosure proposes a dynamic RLC Parameter setting scheme based on a GTP-U Path Management scheme in a CU and DU, such as that illustrated in FIG. 6. For example, the GTP-U Path Management scheme relates to a dynamic setting scheme for a polling timer parameter for periodic timer based polling, such as that described above.

For example, the scheme described based on FIG. 6 may be a scheme for calculating the RTT of a network between a CU and a DU using a sender Tx timestamp, a reflector Rx timestamp and a reflector Tx timestamp in a GTP echo message. Accordingly, this calculation may be the same as a common RTT calculation equation. In this case, the disclosure may be extended to GTP path management and may periodically calculate an RTT.

Specifically, if a transmission delay between a CU and a DU increases, a polling period for an RLC layer needs to be increased. Furthermore, if the transmission delay is reduced, the polling period also needs to be reduced. If a polling period is reduced without considering a transmission delay between a CU and a DU, a terminal may generate a status PDU before an RLC PDU is reached. Accordingly, the unnecessary retransmission of an RLC PDU may occur, air resources are wasted because the transmission delay of a CU and DU is increased, and power consumption of a terminal may be added due to the frequent generation of a status PDU including unnecessary NACK.

Accordingly, the disclosure proposes a scheme for a CU to periodically measure an RTT between the CU and a DU and to determine a polling timer parameter used as the reference value of periodic timer based polling based on the measured RTT.

Figure 7:
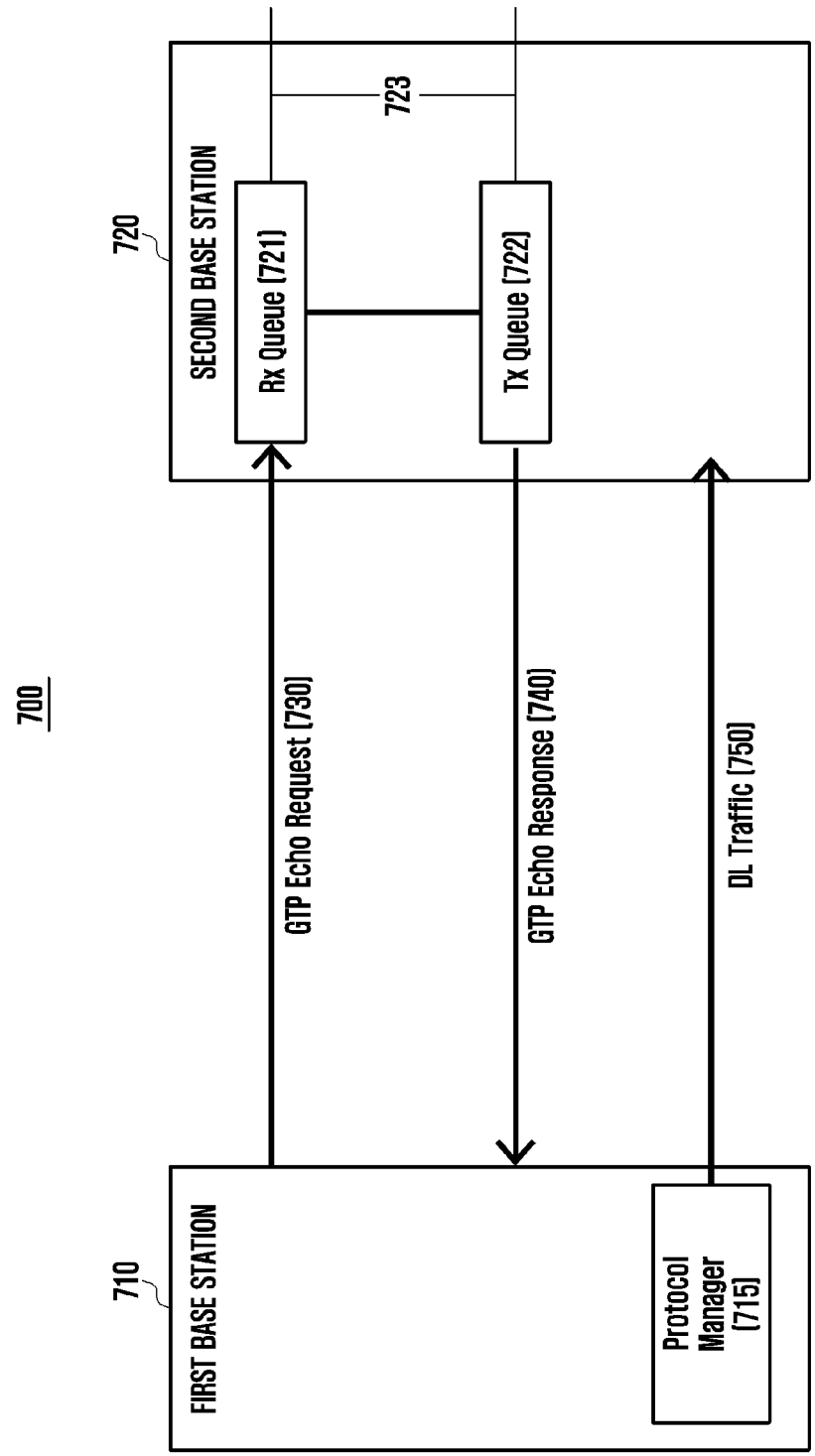
FIG. 7 is a diagram describing a method of measuring the RTT of a fronthaul.

Specifically, in FIG. 7, a first base station 710, such as a CU, included in a base station 700 may transmit a GTP echo request to a second base station 720, such as a DU. The GTP echo request may be received by the Rx Queue 721 of the DU 720. Furthermore, the Tx Queue 722 of the DU 720 may transmit a GTP echo response to the CU 710. The CU 710 may set a polling period, that is, the transmission period of a poll bit, based on a delay 723 from timing in which the Rx Queue 721 of the DU 720 received the GTP echo request to timing in which the Tx Queue 722 transmitted the GTP echo response to the CU 710.

Furthermore, the protocol manager 715 of the CU 710 may transmit downlink traffic 750, such as an RLC PDU, to the DU 720 based on the polling period.

The CU may periodically measure a round trip time (RTT) between the CU and the DU. Furthermore, the CU may set the polling period, that is, the transmission period of a poll bit, based on the periodically measured RTT. For example, the CU may set the polling period so that the polling period is increased in proportion to a measured RTT.

Specifically, as in the following equation, before a call is set up, the CU may determine a polling timer value based on an SRTT value that is calculated in a cycle of 1 second using an initial setting value calculated based on an initial RTT value that is first measured.

PollingTimer=initial setting value*SRTT/initial RTT   [Equation 1]

The SRTT may be a smoothed RTT. In this case, a value of the SRTT may be determined by Equation 2.

SRTT(n)=((1−x)*SRTT(n−1))+(x*RTT)   [Equation 2]

In this case, the x is a weight value and may be set based on a change in the delay between a CU and a DU. For example, the x may be set so that a polling timer is increased in proportion to a delay.

Accordingly, the CU can counteract latency which may occur between the CU and a DU by dynamically setting an RLC Parameter.

In a common ARQ operation such as LTE, a base station has performed retransmission all NACK SNs included in status PDUs received from a terminal. In this case, if a CU and a DU have a non-ideal interface, unnecessary retransmission may be requested due to a delay between the CU and the DU. Accordingly, such unnecessary retransmission may be prevented using a method of limiting a maximum number of retransmission PDUs based on a delay between a CU and a DU. Accordingly, efficiency of the use of air resources can be increased.

Figure 8:
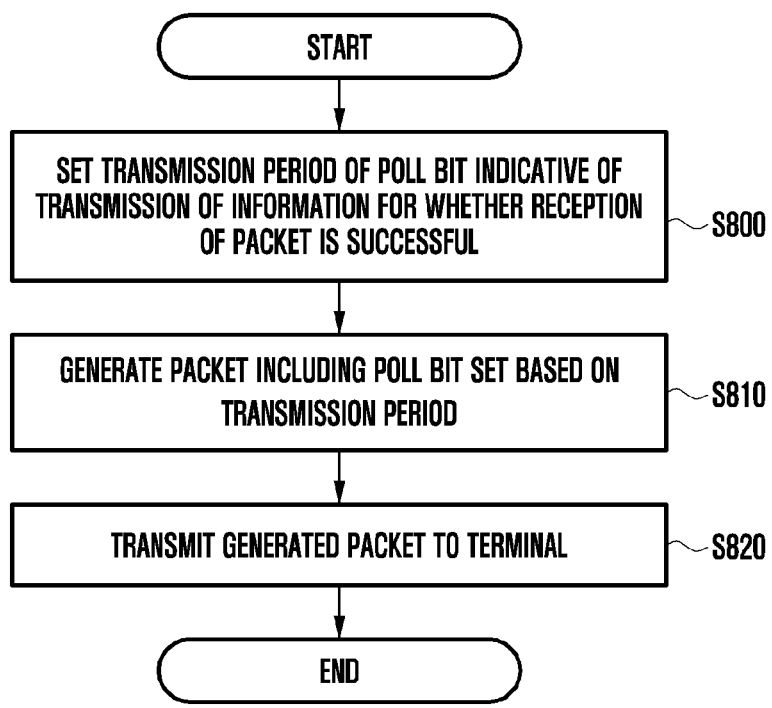
FIGS. 8 and 9 are flowcharts illustrating a communication method of a base station according to various embodiments of the disclosure.

FIG. 8 is a flowchart illustrating a communication method of a base station according to an embodiment of the disclosure.

First, at step S800, the base station may set the transmission period of a poll bit indicative of the transmission of information for whether the reception of a packet is successful. The transmission period may be referred to as a polling period or a polling timer. The base station may be configured with the transmission period by an operator. Alternatively, if the base station includes a first base station (CU) and a second base station (DU), the transmission period may be set based on a delay between the CU and the DU. In this case, the CU may set the transmission period.

At step S810, the base station may generate a packet including a poll bit set based on the transmission period. The packet may be an RLC PDU generated in an RLC layer. Furthermore, the poll bit may be set in an RLC header.

When the set transmission period is reached regardless of the number of packets or the size of a packet transmitted to a terminal, the base station may generate a packet in which the poll bit has been set. The packet may be a packet generated to include a header in which the poll bit has been set using a packet finally transmitted before the set transmission period is reached.

At step S820, the base station may transmit the generated packet to a terminal. Furthermore, the terminal that has received the packet in which the poll bit has been set may generate a status report message indicating whether the reception of at least one packet transmitted by the base station is successful, and may transmit the status report message to the base station.

Figure 9:
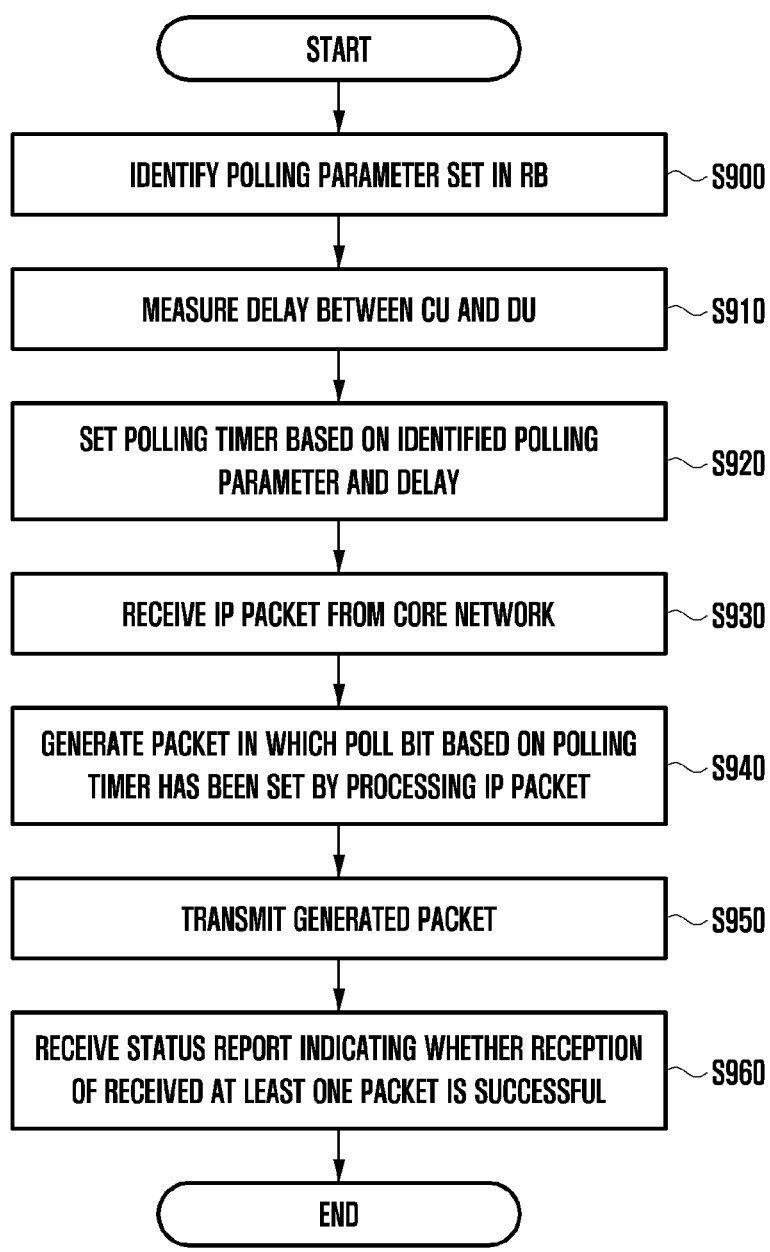

FIG. 9 is a flowchart illustrating a communication method of a base station according to another embodiment of the disclosure. In this case, the base station may include a first base station (CU) and a second base station (DU).

First, at step S900, the CU may identify a polling parameter set in an RB. Furthermore, at step S910, the CU may measure a delay between the CU and the DU. The CU may calculate the delay by periodically measuring an RTT between the CU and the DU.

At step S920, the CU may set a polling timer based on the identified polling parameter and the delay. Alternatively, the base station may be configured with the polling timer by an operator. In this case, the CU may adjust the polling timer based on the identified polling parameter and the delay.

At step S930, an IP packet may be received from a core network. The core network may transmit, to the base station, a downlink IP packet to be transmitted to a terminal.

Furthermore, at step S940, the CU may generate a packet in which a poll bit based on the polling timer has been set by processing the IP packet. Specifically, the CU may generate an RLC PDU by processing the IP packet, and may transmit the generated RLC PDU to the DU. However, this is merely an embodiment, and an RLC layer may be managed in the DU and the RLC PDU may be generated in the DU.

When the RLC PDU is generated, the poll bit may be set based on the polling timer. For example, an RLC PDU in which a poll bit indicative of the transmission of information for whether the reception of the RLC PDU is successful has been set may be generated every polling timer.

Furthermore, at step S950, the generated packet may be transmitted. For example, the CU may transmit the generated RLC PDU to the terminal through the DU.

At step S960, the base station may receive, from the terminal, a status report indicating whether the reception of a received at least one packet is successful. For example, the terminal may generate a status report whenever an RLC PDU in which a poll bit indicative of the transmission of information for whether the reception of the RLC PDU is successful has been set is received. Specifically, the terminal may generate a status report, including ACK/NACK information for an RLC PDU in which a poll bit indicative of the transmission of information for whether the reception of the RLC PDU is successful has been set and an RLC PDU in which the poll bit has not been set, which has been received before an RLC PDU in which the poll bit has been set, and may transmit the generated status report to the base station.

Furthermore, the base station may perform retransmission on an RLC PDU indicated as NACK.

Figure 10:
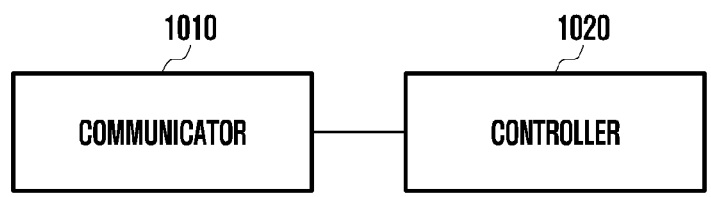
FIG. 10 is a block diagram illustrating elements of a base station according to an embodiment of the disclosure.

FIG. 10 is a block diagram illustrating elements of a base station according to an embodiment of the disclosure.

The base station may include a communicator 1010 and a controller 1020.

The communicator 1010 is an element for transmitting and receiving signals. For example, the base station may transmit a packet to a terminal through the communicator 1010, and may receive a status report.

The controller 1020 is an element for generally controlling the base station.

For example, the controller 1020 may set the transmission period of a poll bit indicative of the transmission of information for whether the reception of a packet is successful, may generate a packet including a poll bit set based on the transmission period, and may control the communicator 1010 to transmit the generated packet to a terminal.

Furthermore, the controller 1020 may generate a packet in which a poll bit has been set when the set transmission period is reached regardless of the number of transmitted packets.

The packet in which the poll bit has been set may be a packet generated to include a header in which the poll bit has been set using a packet finally transmitted before the set transmission period is reached.

Furthermore, the controller 1020 may control the communicator 1010 to receive a status report message, indicating whether the reception of at least one packet received from the base station is successful, from a terminal that has received the packet in which the poll bit has been set.

The base station may include a first base station and a second base station. Furthermore, if a radio link control packet data unit (RLC PDU) in which the poll bit has been set is generated by the first base station, the RLC PDU may be transmitted to the terminal through the second base station.

Furthermore, the controller 1020 may identify a delay between the first base station and the second base station, and may set the transmission period based on the identified delay. In this case, the controller 1020 may control both the first base station and the second base station or may be separately included in each of the first base station and the second base station. If separate controllers are included in the first base station and the second base station, respectively, the controller of the first base station may identify a delay between the first base station and the second base station.

The controller 1020 may measure a round trip time (RTT) between the first base station and the second base station every preset period and set the transmission period in proportion to the measured RTT through the first base station.

Figure 11:
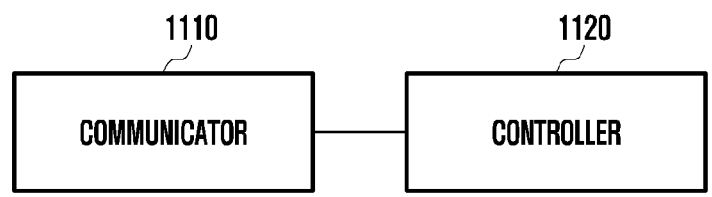
FIG. 11 is a block diagram illustrating elements of a terminal according to an embodiment of the disclosure.

FIG. 11 is a block diagram illustrating elements of a terminal according to an embodiment of the disclosure. The terminal may include a communicator 1110 and a controller 1120.

The terminal may transmit and receive signals through the communicator 1110. For example, the terminal may perform communication with a base station through the communicator 1110.

The controller 1120 is an element for generally controlling the terminal. For example, the controller 1120 may control the communicator 1110 to receive, from a base station, a packet in which a poll bit indicative of the transmission of information for whether the reception of the packet is successful has been set, may generate a status report message indicating whether the reception of at least one packet received from the base station is successful when the packet in which the poll bit has been set is received, and may control the communicator 1110 to transmit the generated status report message to the base station.

The packet in which the poll bit has been generated may be a packet received every preset transmission period that is set regardless of the number of packets received from the base station. In this case, the packet may be a packet generated to include a header in which the poll bit has been set using a packet finally transmitted before the set transmission period is reached.

The aforementioned elements of the terminal or the base station may be implemented in a software way. The controller of the terminal or the base station may further include a flash memory or other non-volatile memory. A program for performing each role of the controller may be stored in such a non-volatile memory.

Furthermore, the controller of the terminal or the base station may be implemented in a form including a CPU and a random access memory (RAM). The CPU of the controller may perform a function for copying the programs, stored in the non-volatile memory, to a RAM and performing functions of the terminal or the base station, such as those described above, by executing the copied programs.

The controller is an element responsible for control of the terminal or the base station. The controller has the same meaning as a central processing unit, a micro processor, a processor, or an operating system, and may be interchangeably used with them. Furthermore, the controller of the terminal or the base station may be implemented as a single system (system-on-a-chip or system on chip (SoC)) along with another function unit, such as a communication module included in the terminal or the base station.

The aforementioned control method of the terminal or the base station according to various embodiments may be coded in a software form and stored in a non-transitory readable medium. Such a non-transitory readable medium may be mounted on various devices and used.

The non-transitory readable medium means a medium which semi-permanently stores data unlike a medium for storing data for a short time, such as a register, a cache, or a memory, and which is readable by a device. Specifically, a CD, a DVD, a hard disk, a Blu-ray disk, a USB, a memory card, or a ROM may be the non-transitory readable medium.

Furthermore, although the preferred embodiments of the disclosure have been illustrated and described above, the disclosure is not limited to the above-described specific embodiments, and a person having ordinary skill in the art to which the disclosure pertains may modify the disclosure in various ways without departing from the gist of the disclosure in the claims. Such modified embodiments should not be individually understood from the technical spirit or prospect of this specification.

What is claimed is:

1. A method performed by a base station in a wireless communication system, the method comprising:
    setting a transmission period of a poll bit indicative of a transmission of information for whether a reception of at least one packet is successful;
    generating a packet comprising the poll bit, the poll bit being set based on the transmission period;
    transmitting the generated packet to a terminal; and
    receiving, from the terminal, a status report message including the information for whether the reception of the at least one packet is successful,
    wherein the base station comprises a first base station and a second base station, and the transmission period is based on a transmission delay between the first base station and the second base station.

2. The method of claim 1,
    wherein the transmission period is reached regardless of a number of transmitted packets, and
    wherein the generated packet comprises a header in which the poll bit has been set and a payload of a packet finally transmitted prior to the set transmission period being reached.

3. The method of claim 1,
    wherein a radio link control packet data unit (RLC PDU) is transmitted to the terminal through the second base station in case that the RLC PDU in which the poll bit has been set is generated by the first base station, and
    wherein the setting the transmission period comprises:
    identifying the transmission delay between the first base station and the second base station; and
    setting the transmission period based on the identified transmission delay.

4. The method of claim 1, wherein the setting the transmission period further comprises:
    measuring, by the first base station, a round trip time (RTT) between the first base station and the second base station every preset period; and
    setting the transmission period in proportion to the measured RTT.

5. A base station in a wireless communication system, the base station comprising:
    a transceiver; and
    a controller configured to:
        set a transmission period of a poll bit indicative of a transmission of information for whether a reception of at least one packet is successful,
        generate a packet comprising the poll bit, the poll bit being set based on the transmission period,
        transmit, to a terminal via the transceiver, the generated packet, and
        receive, from the terminal via the transceiver, a status report message including the information for whether the reception of the at least one packet is successful,
    wherein the base station comprises a first base station and a second base station, and the transmission period is based on a transmission delay between the first base station and the second base station.

6. The base station of claim 5,
    wherein the transmission period is reached regardless of a number of transmitted packets.

7. The base station of claim 5,
    wherein the generated packet comprises a header in which the poll bit has been set and a payload of a packet finally transmitted prior to the set transmission period being reached.

8. The base station of claim 5, wherein the first base station is a central unit (CU) entity of the base station and the second base station is a distributed unit (DU) entity of the base station.

9. The base station of claim 5,
    wherein a radio link control packet data unit (RLC PDU) is transmitted to the terminal through the second base station in case that the RLC PDU in which the poll bit has been set is generated by the first base station.

10. The base station of claim 5, wherein the controller is configured to:
    identify the transmission delay between the first base station and the second base station; and
    set the transmission period based on the identified transmission delay.

11. The base station of claim 5, wherein, the controller is configured to:
    measure, by the first base station, a round trip time (RTT) between the first base station and the second base station every preset period; and
    set the transmission period in proportion to the measured RTT.

12. A method performed by a terminal in a wireless communication system, the method comprising:

receiving, from a base station, a packet in which a poll bit indicative of a transmission of information for whether a reception of at least one packet is successful has been set;

generating a status report message including the information for whether the reception of the at least one packet received from the base station is successful in case that the packet in which the poll bit has been set is received; and transmitting the generated status report message to the base station, wherein the poll bit is set based on a transmission period of the poll bit, and wherein the base station comprises a first base station and a second base station, and the transmission period is based on a transmission delay between the first base station and the second base station.

13. The method of claim 12, wherein the transmission period is reached regardless of a number of packets transmitted by the base station, and wherein the packet in which the poll bit has been set comprises a header in which the poll bit has been set and a payload of a packet finally transmitted prior to the set transmission period being reached.

14. A terminal in a wireless communication system, the terminal comprising:

a transceiver; and a controller configured to:

receive, from a base station via the transceiver, a packet in which a poll bit indicative of a transmission of information for whether a reception of at least one packet is successful has been set, generate a status report message including the information for whether the reception of the at least one packet received from the base station is successful in case that the packet in which the poll bit has been set is received, and transmit, via the transceiver, the generated status report message to the base station, wherein the poll bit is set based on a transmission period of the poll bit, and wherein the base station comprises a first base station and a second base station, and the transmission period is based on a transmission delay between the first base station and the second base station.

15. The terminal of claim 14, wherein the transmission period is reached regardless of a number of packets transmitted by the base station, and wherein the packet in which the poll bit has been set comprises a header in which the poll bit has been set and a payload of a packet finally transmitted prior to the set transmission period being reached.

* * * * *